United States Patent [19]

Tamura

[11] Patent Number: 4,463,364

[45] Date of Patent: Jul. 31, 1984

[54] IMAGE FORMING PROCESS AND APPARATUS THEREFOR

[75] Inventor: Yasuyuki Tamura, Kawasaki, Japan

[73] Assignee: Canon Kabushiki Kaisha, Tokyo, Japan

[21] Appl. No.: 311,443

[22] Filed: Oct. 14, 1981

[30] Foreign Application Priority Data

Oct. 16, 1980 [JP] Japan ................................. 55-143729

[51] Int. Cl.³ .......................................... G01D 15/14
[52] U.S. Cl. ..................................... 346/160; 346/108
[58] Field of Search ................. 346/76 L, 108, 139 R, 346/141, 160; 350/6.8; 358/285, 293, 300

[56] References Cited

U.S. PATENT DOCUMENTS 4,395,721  7/1983  Ohno et al. .......................... 346/160

Primary Examiner—Thomas H. Tarcza
Attorney, Agent, or Firm—Fitzpatrick, Cella, Harper & Scinto

[57] ABSTRACT

An image forming process and an apparatus capable of reproducing fine lines or small dots in an image, includes a light beam generator, a driver for driving the light beam generator to form the image on a photosensitive member by scanning the member with the light beam, and a controller for controlling the driver to regulate the intensity of the light beam in accordance with information representing the image for at least one of the preceding and succeeding scanning with the light beam.

3 Claims, 4 Drawing Figures

IMAGE FORMING PROCESS AND APPARATUS THEREFOR

BACKGROUND OF THE INVENTION

1. Field of the Invention

The present invention relates to an image reproducing apparatus, for example utilizing an electrophotographic process, and more particularly to an image forming apparatus in which a latent image is formed by scanning a photosensitive member with a laser beam or the like and is then rendered visible.

2. Description of the Prior Art

An example of such image reproducing apparatus is a laser recording apparatus as disclosed in the Japanese Patent Laid-open No. Sho 51-8949. This apparatus makes use of a reproducing process toner in which is deposited in the area exposed to the laser beam, or a process in which toner is deposited in the area not exposed to the laser beam. In either process it has been difficult to correctly record a fine line with a sufficient image density.

The laser beam scanning is usually conducted by deflecting a laser beam with a rotating polygonal mirror. The laser beam, after deflection generally has a diameter of 1 to 5 mm and is focused onto a photosensitive member through an f.$\theta$ lens. The focal length of said lens must be selected large enough to expand the width of the image. On the other hand, the diameter of the laser beam incident on the rotating polygonal mirror is limited since the mechanism for this mirror cannot be made excessively large. Also it is known that the spot diameter focused on the photosensitive member is proportional to the focal length of the f.$\theta$ lens and to the wavelength of the laser beam and is inversely proportional to the beam diameter entering the lens. For this reason, the minimum spot diameter obtained on the photosensitive member is practically limited.

Consequently the focused spots may mutually overlap between the adjacent scanning lines when they are positioned close to each other. Thus, in the process in which the non-image area is exposed to the laser beam, a fine line or a small dot, which should not be exposed, is in fact weakly exposed to the laser beam for the adjacent scanning line, leading to a weak and blurred latent image which produces unclear recording with insufficient density after image development. A similar situation occurs in the process of exposing the image area and depositing toner thereon, in which case a fine line or a small dot is not overlapped with the beam of the adjacent line and has therefore a lower exposure to light in comparison with a large image area exposed with overlapping lines. Therefore, a weak latent image results.

SUMMARY OF THE INVENTION

In consideration of the foregoing, an object of the present invention is to provide an image forming process and an apparatus therefor, not characterized by the abovementioned drawbacks.

Another object of the present invention is to provide an image forming process and an apparatus therefor capable of reproducing fine lines or small dots in the image.

Still another object of the present invention is to provide an image forming apparatus capable of clearly distinguishing the image area from the non-image area.

Still another object of the present invention is to provide an image forming process and an apparatus therefor capable of faithfully reproducing an image even in the auxiliary scanning direction.

Still another object of the present invention is to provide an improvement on the image forming apparatus so that it is capable of image formation by light beam scanning of the non-image area.

Still another object of the present invention is to provide an image forming process and an apparatus therefor capable of forming clear image edges.

Still another object of the present invention is to provide an improvement in the image forming apparatus so that it is capable of image formation by light beam scanning of the image area.

The foregoing and still other objects of the present invention will be made apparent from the following description of the preferred embodiments.

DESCRIPTION OF THE PREFERRED EMBODIMENTS

In latent image formation on a rotating drum by laser beam scanning along the rotary axis of said drum, the enhancement of the latent image can be achieved in the principal scanning direction of the laser beam on the photosensitive drum by suitable manipulation of the image signals. For example, the on-off timing of the laser beam can be slightly modified in such a manner that the latent image area becomes larger than the size of the image corresponding to the image signals, thus increasing the width of a fine line. In this manner it is possible to enhance the latent image of a fine line or a small dot in the principal scanning direction.

On the other hand, in the auxiliary scanning direction, which is perpendicular to the principal scanning direction and is normally selected in the rotating direction of the photosensitive drum, the above-mentioned timing control is not applicable since the scanning control is independent from the control system for laser beam.

In the following embodiment of the present invention, the intensity of the laser beam is controlled for each scanning line, and this control is achieved by modulating the laser beam, the on-off time of which is controlled by the image signals of the scanning line and by the image signals of an adjacent scanning line.

The above-mentioned embodiment will now be explained in detail in the following description to be taken in conjunction with the attached drawings.

Figure 1:
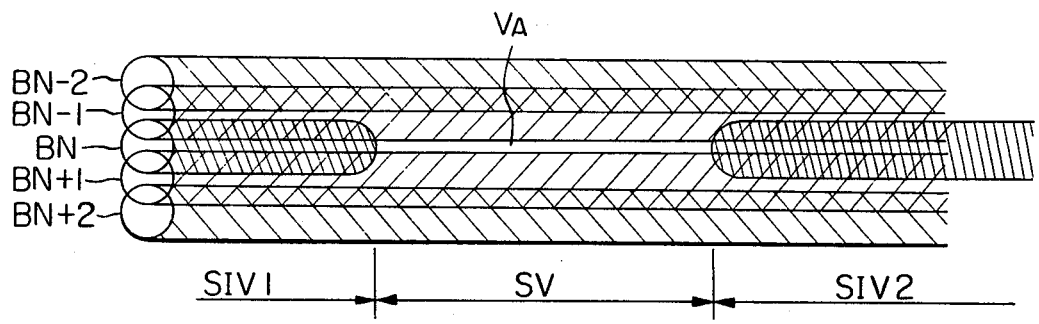
FIG. 1 is a schematic view showing the juxtaposition of scanning beams on a photosensitive member.

In the following description a process is explained in which the non-image area is exposed to the light beam. FIG. 1 is a schematic view showing scanning with a laser beam, in which an N-th beam line BN is currently scanned by the laser beam. In case a fine line is recorded in the principal scanning direction, the laser beam BN is turned off for a time corresponding to scanning of the image area VA of the fine line. The contrast of the image area VA is however lowered by the exposure to the laser beam in the scanning lines BN−1 and BN+1 adjacent the line BN, wherein the lines BN−1 and BN+1 respectively constitute the scanning lines immediately preceding and succeeding in time the scanning line BN.

Such inconvenience can however be avoided by reducing the intensity of the laser beam in the preceding and succeeding scanning lines BN−1, BN+1 in areas positioned above or below the image area VA. Such reduction in beam intensity will significantly decrease the light intensity in the peripheral portion of the beam, but the central portion of said beam still has a considerable intensity to prevent abnormal expansion of the image area VA. In this manner it is possible to regulate the image area VA to be a suitable dimension by appropriate reduction of the beam intensity in scanning of the lines BN−1 and BN+1.

In an inverted process in which the image area is exposed to light, the image area can be clearly reproduced by reducing the exposure intensity in the non-image area neighboring the image area.

The above-mentioned regulation of laser beam intensity can be achieved, in case of a semi-conductor laser, by changing the drive current supplied to the laser unit. Consequently the drive current for the beam corresponding to the line BN−1 or BN+1 is modulated according to the image signals on the line BN.

Figure 2:
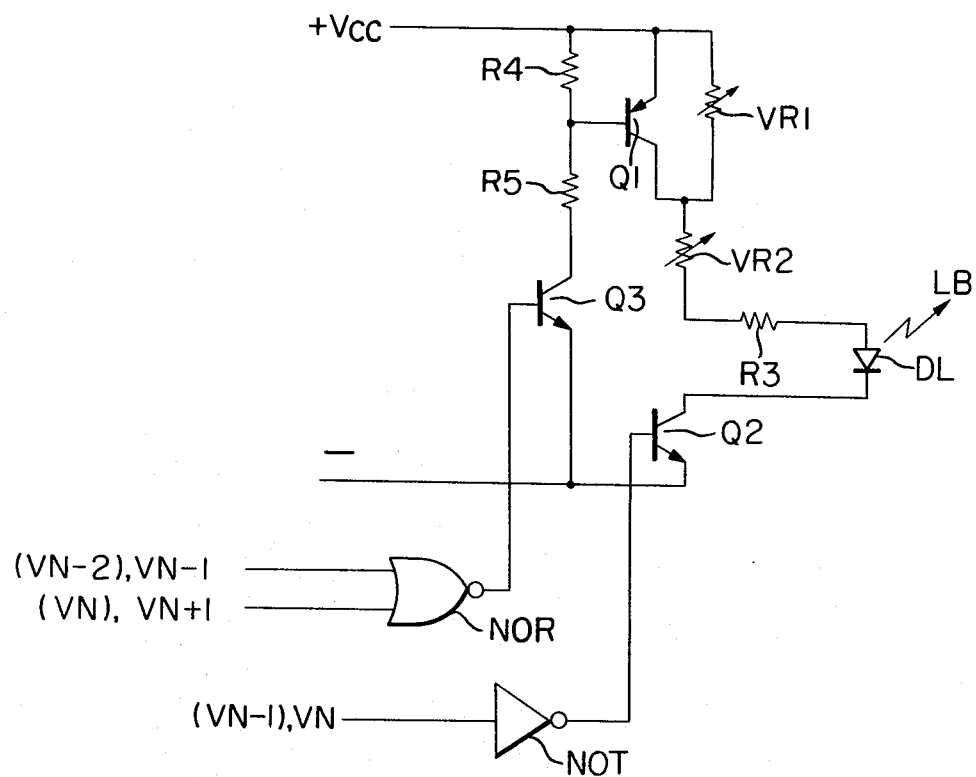
FIGS. 2, 3 and 4 are circuit diagrams showing examples of a laser driver circuit that may be used in the present invention.

FIG. 2 is a circuit diagram showing an embodiment of the laser driver circuit that may be used in the image forming apparatus of the present invention, wherein the circuit is described for a process of exposing the non-image area.

In the circuit shown in FIG. 2, there are serially connected between the positive pole and negative pole of a power supply Vcc, the emitter-collector circuit of a pnp transistor Q1 in parallel with a first variable resistor VR1, a second variable resistor VR2, a resistor R3, a diode laser DL and the collector-emitter circuit of an npn transistor Q2. Also connected serially between the poles are a resistor R4, another resistor R5 and the collector-emitter circuit of a transistor Q3. The junction between said resistors R4 and R5 is connected to the base of said transistor Q1. An inverter NOT receiving the image signals VN of the beam currently scanning the N-th line supplies output signals to the base of said transistor Q2, and a NOR circuit receiving the image signals VN−1 for the (N−1)th line and image signals VN+1 for the (N+1)th line supplies output signals to the base of the transistor Q3.

The function of the circuit described above is as follows. For the purpose of clarity, the scanning areas above and below the image area in FIG. 1 are referred to as SV, while the scanning areas at the left and right of the image area are respectively referred to as SIV1 and SIV2.

Now reference is made to FIGS. 1 and 2, wherein the image signals VN−1, VN and VN+1 are at the low or L-level in the non-image area which are not to be reproduced as an image and in this embodiment are, therefore, exposed by the laser. Consider the laser beam exposure in accordance with the image signals VN of the N-th line corresponding to the image area VA. When the image signals VN are supplied to the inverter NOT, the image signals VN−1 and VN+1 for the preceding and succeeding lines are simultaneously supplied to the circuit NOR. The image signals VN−1 and VN+1, only representing non-image areas, are always at the L-level to provide the high or H-level signal from the circuit NOR, thereby turning on the transistors Q3 and Q1. When the scanning beam is on the N-th line and is in the non-image areas SIV1 or SIV2, the image signal VN is at the L-level to provide an H-level signal from the inverter NOT, thereby turning on the transistor Q2. Consequently the diode laser DL emits a strong beam LB indicating the non-image area on the photosensitive member. On the other hand, when the beam is in the image area VA, the image signal VN is at the H-level to provide an L-level signal from the inverter NOT, thus turning off the transistor Q2. Consequently the drive current circuit for the diode laser DL is turned off to terminate beam emission therefrom, thus indicating the image area VA on the photosensitive member.

Consider the case of scanning on the preceding (N−1)th line with corresponding image signals VN−1. In this case the inverter NOT receives the image signal VN−1 while the circuit NOR receives the image signals VN−2 and VN. The latter is at the H-level only when the scanning beam is present in the scanning area SV, whereby the circuit NOR provides an L-level signal to turn off the transistors Q3 and Q1 during scanning of that area. On the other hand the image signal VN−1 is always at the L-level since the (N−1)th line only contains non-image area, whereby the transistor Q2 is turned on to emit the laser beam LB from the diode laser DL. However, when the beam is present in the scanning area SV on the (N−1)th line, the laser drive current flows through the first variable resistor VR1 since the transistor Q1 is turned off because of the H-level state of the signal VN. In this manner the laser drive current is reduced by the presence of said resistor VR1 to provide, from the diode laser DL, a "weak" laser beam with a reduced intensity, with which the scanning area SV on the (N−1)th line is exposed.

On the other hand, even in the (N−1)th line, the image signal VN is at the L-level when the beam is present in the scanning areas SIV1 or SIV2 to provide an H-level signal from the circuit NOR, thus turning on the transistor Q1 and emitting a "strong" beam from the diode laser DL for exposure.

Further, in the beam scanning on the succeeding (N+1)th line, the inverter NOT receives the image signal VN+1 while the circuit NOR receives the signals VN and VN+2. The exposure with the laser beam in this case is conducted in a similar manner as in scanning of the (N−1)th line. More specifically, the image signal is constantly at the L-level to turn on the transistor Q2, thereby emitting the laser beam LB from the diode laser DL.

When the beam is present in the scanning area SV, the image signal VN is at the H-level to turn off the transistor Q1, thereby causing the laser to emit a "weak" beam.

On the other hand, when the beam is present in the scanning areas SIV1 or SIV2, the image signals VN and VN+2 are both at the H-level to turn on the transistor Q1, thereby causing a "strong" laser beam.

In this manner the beam intensity is reduced during scanning corresponding to the area SV by the image signals VN−1 and VN+1 for the scanning lines immediately above and below the image area VA, thus preventing the fine-lined image area from becoming unclear due to exposure by the beam during scanning of the (N−1)th and (N+1)th lines.

During the scanning of for example the (N−1)th line, the image signals VN−2 and VN for the neighboring lines can be obtained from shift registers provided for storing such signals.

Figure 4:
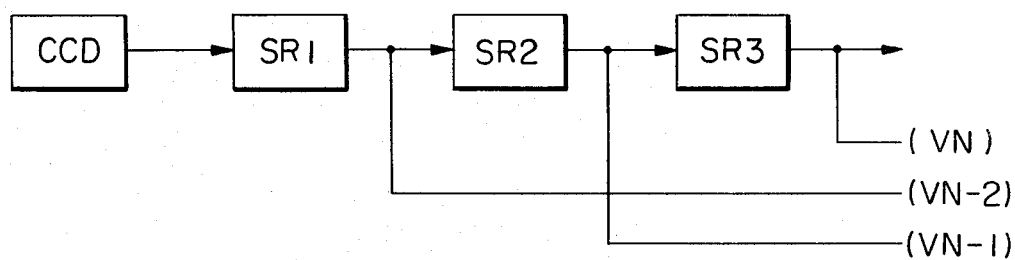

More specifically, in case of reading a document with a charge-coupled device or the like for modulating the laser beam for scanning the photosensitive member, in order to form a latent image thereon, there are provided at least three shift registers as shown in FIG. 4, whereby the image signals of one scanning line obtained from a document are at first stored in a shift register SR1, and the signals of the succeeding lines are stored in succession in the three registers by sequential signal transfer. Thus, in case the central second shift register SR2 contains the image signals $VN-1$ for example, the signals $VN-2$ and VN are respectively stored in the first and third shift registers SR1, SR3.

The variable resistors VR1 and VR2 are provided to respectively regulate the intensities of the "weak" and "strong" laser beams.

It is to be further noted that the beam regulation also can be achieved by shifting the on-off timing of the laser beam. Furthermore, also in image formation by an ink jet process, a similar control is applicable to the ink jet for preventing the thinning of the fine line.

Figure 3:
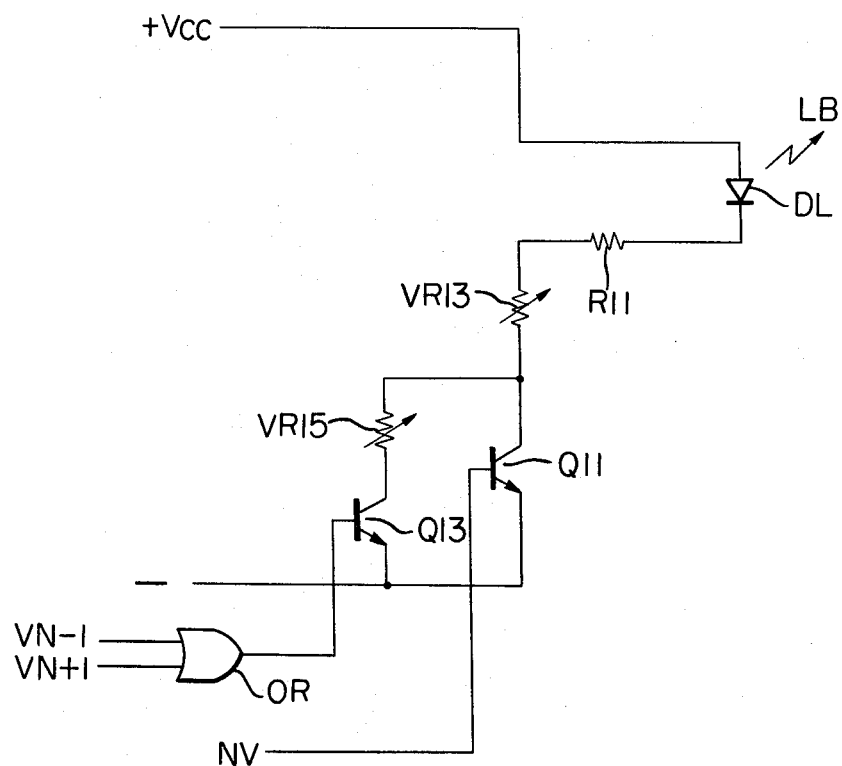

FIG. 3 is a circuit diagram showing another embodiment of the laser drive circuit that may be used in the image forming apparatus of the present invention and employing an imaging process in which the image area is exposed to the laser beam. As shown in FIG. 3, connected serially between the positive and negative poles of the power supply are a diode laser DL, a resistor R11, a variable resistor VR13 and the collector-emitter circuit of an npn transistor Q11. A serial circuit of a variable resistor VR15 and an npn transistor Q13 is connected in parallel with the transistor Q11. The image signal VN corresponding to a line currently scanned is supplied to the base of said transistor Q11, while the image signals $VN-1$, $VN+1$ corresponding to the immediately preceding and succeding lines are supplied to an OR circuit the output signal of which is supplied to the base of the transistor Q13.

The function of the above-explained circuit is as follows. In the present embodiment the image signal assumes the H-level during scanning of to the image area, wherein the transistor Q11 is turned on to cause the diode laser DL to emit a laser beam LB. However, in the non-image area the transistor Q11 is turned off to terminate the laser beam emission.

In the beam scanning on the $(N-1)$th and $(N+1)$th lines immediately above and below the image area, the transistor Q11 is constantly turned off but the image signal VN containing the image area is supplied to the circuit OR to turn on the transistor Q13 during scanning corresponding to the H-level of the signal VN, thus causing a laser drive current through the transistor Q13 and the variable resistor VR15 to generate a "weak" beam LB.

In this manner the image exposure with said "weak" beam is conducted in the lines immediately adjacent to the image area, enabling reproduction of a fine line, for example.

Such weak beam functions as compensation for a fine line or a small dot which otherwise receives a weaker exposure than a larger image area composed of plural scanning beams. For the same reason such exposure functions to enhance the edge of an image area which will otherwise be exposed more weakly than other portions of the image area.

The variable resistors VR13 and VR15 are provided to respectively control the intensities of the "strong" and "weak" beams.

As explained in the foregoing, the present invention enables precise reproduction of very fine lines or the like, through the control on the intensity or on-off timing of the exposing beam on a scanning line by means of the image signals for the preceding and succeeding scanning lines.

What I claim is:

1. An image forming apparatus for forming an image, based on image information, on a photosensitive member, said apparatus comprising:
means for generating a light beam;
means for driving said light beam generating means to form an image on the photosensitive member by scanning the photosensitive member with said light beam; and
means for controlling said drive means to regulate the intensity of said light beam generated by said light beam generating means in accordance with the image information representing at least one of the preceding and succeeding scanning with said light beam.

2. An image forming apparatus for forming an image, based in image information signals, on a recording medium, said apparatus comprising:
means for generating a light beam;
means for scanning the recording medium with said light beam generated by said light beam generating means to form an image thereon;
means for entering image information signals for the scanning of adjacent scanning lines into said apparatus; and
means for controlling the scanning mode of said light beam generating means to control the generation of said light beam thereby in response to said image information signals for adjacent scanning lines during scanning by said scanning means.

3. An image forming process which comprises the steps of: scanning lines on a medium to form an image thereon in accordance with image information, and controlling the density of scanning in response to image information for the scanning of adjacent scanning lines.

* * * * *